United States Patent [19]

Gospodar et al.

[11] 3,983,853

[45] Oct. 5, 1976

[54] INDUCTION PIPE FOR INTERNAL COMBUSTION ENGINES

[75] Inventors: Reinhard Gospodar; Kurt Reichel, both of Wolfsburg; Gustav Vogelsang, Braunschweig; Peter Thauer, Neuhaus, all of Germany

[73] Assignee: Volkswagenwerk Aktiengesellschaft, Wolfsburg, Germany

[22] Filed: Jan. 7, 1974

[21] Appl. No.: 431,150

Related U.S. Application Data

[62] Division of Ser. No. 96,037, Dec. 8, 1970, Pat. No. 3,811,416.

[30] Foreign Application Priority Data

Dec. 11, 1969   Germany............................ 1962113

[52] U.S. Cl............................................. 123/52 M
[51] Int. Cl.$^2$......................................... F02B 75/20
[58] Field of Search ......................... 123/52 M, 141

[56] References Cited

UNITED STATES PATENTS

| 2,137,802 | 11/1938 | Ginn .................................... 123/52 |
| 2,241,461 | 4/1941 | Jacoby ................................. 123/52 |
| 3,111,937 | 11/1963 | Johnson et al. .................. 123/52 M |

FOREIGN PATENTS OR APPLICATIONS

| 41-3325 | 2/1966 | Japan |
| 257,209 | 1/1946 | Switzerland |

Primary Examiner—Wendell E. Burns
Assistant Examiner—David D. Reynolds
Attorney, Agent, or Firm—Brumbaugh, Graves, Donohue & Raymond

[57] ABSTRACT

An induction pipe for internal combustion engines having a distributor section and supply lines for the mixture with the deflector having means therein to even the distribution of the mixture and the deflector being formed by a wall between the branch off points and also provided with recesses.

9 Claims, 10 Drawing Figures

INDUCTION PIPE FOR INTERNAL COMBUSTION ENGINES

This is a division of application Ser. No. 96,037, filed Dec. 8, 1970, now U.S. Pat. No. 3,811,416.

This invention relates to an induction pipe for gas mixtures of internal combustion engines.

As is well known, especially in the case of such multicylinder engines which contain a cross draft carburetor or horizontal carburetor with likewise horizontally running feed lines for the mixture, there occur difficulties insofar as the mixtures fed to the various cylinders may contain varying compositions. Thus, the inside cylinders located in the flow direction of the carburetor are fed with a richer mixture over wide areas of the load, while the outside cylinders will obtain a mixture considerably poorer in fuel. The supply of cylinders lying on the inside with a richer mixture is accompanied by difficulties in regard to the decontamination of the exhaust gas, while the supply of the outside cylinder with a mixture which has less fuel will likewise be followed by an undesirable drop in performance.

The present invention relates to an induction pipe for the mixture for combustion engines with at least three cylinders, containing a distributor section and feed lines to the cylinders for the mixture which branch off, as well as a deflector for evening the distribution of the mixture, which deflector runs transversely to the path of the mixture flowing into the distributor section. Such an arrangement has become known in a manner in which four feed pipes for the mixture have been disposed by pairs slantingly one behind the other and one above the other and running in parallel to one another. As a result thereof, two pipe strings are formed which divide the stream of mixture into two parts flowing in from the carburetors. The deflector against which the inflowing mixture rebounds is constituted in this case by the wall of the first pipe string which is in the rear in the direction of the inflow, since the second pipe string has been disposed displaced higher up. Even with this arrangement however it is not reliably possible in the case of low temperatures (cold start) and low r.p.m. of the engine to achieve the desired evening of the distribution of the mixture; rather, only the pipe string lying below will obtain liquid portions of the fuel, while the cylinders fed through the upper string will include an insufficient quantity of fuel. The known arrangement therefore theoretically, to be sure, will cause a distribution of the stream of the mixture in two partial streams corresponding to the two pairs of the two feed lines of the mixture for the cylinder arranged each time at one level, but it does not take into account the fact that, especially in the case of low temperatures, the composition of the mixture in the intake area, viewed over the cross section, is in no way constant.

The induction pipe for the mixture according to the present invention takes these circumstances into account by the fact that the feed lines for the mixture on the distributor section run at the same level and the deflector is formed by a special wall provided between the branching off places, which wall has been provided with recesses within the area contacted by the inflowing mixture and/or which is so narrow that between its lateral edges, on the one hand, and intermediate walls between the feed lines of the mixture lying in its alignment, on the other hand, there remain free distances.

In the case of the present invention, therefore, one does not simply make a distribution of the mixture stream into several partial streams, but the surface required for this purpose has been shaped in such a way, that is to say it has been equipped with recesses, that it will cause an evening or uniformity of the mixture fed to the various cylinders. Especially in the case in which the surface because of a corresponding width of the wall extends to be sure over the entire width of the inflow area but does not directly pass over into the intermediate walls between adjoining feed lines of the mixture, additional points of view of flow technique probably play a role in the case of the thorough mixing.

For the constructional development of the invention an entire series of possibilities may be stated. Thus, the recesses may be in the form of holes which are drilled subsequently or which can be shaped already from the very beginning during the production of the induction pipe for the mixture. The recesses may also be notched subdividing the wall and running perpendicularly to the plane of the supply lines for the mixture.

The wall itself may extend over an entire inside diameter of the pipe perpendicular to the inflow direction. For example, it may be provided with a recess likewise extending across the entire inside diameter of the pipe in such a way that this recess lies in the middle and thereby subdivides the wall into two partial walls located to the left and to the right thereof. But the wall may also extend, starting out from the inside wall of the pipe, over a quarter and up to a half of the inside diameter of the pipe perpendicular to the inflow direction. In this case, therefore, the wall leaves open, for example, half an inflow cross section through which the mixture can flow into the supply lines of the mixture located behind in the inflow direction. It appears that for low speeds of travel and very slight loads, a height of the wall corresponding to half the inside diameter of the pipe will show favorable results. On the other hand, this dimensioning would increase too much the inflow resistance for the supply line of the mixture lying behind in the inflow direction, in the upper r.p.m. or load range. In this case, therefore, a height of the wall which corresponds approximately to one-fourth of the inside diameter will be more favorable and for these reasons it may also be effective to assign adjusting means to the wall, by which the wall can be more or less moved into the path of the inflowing mixture. These adjusting means can be dependent on the r.p.m. and/or on the load. A corresponding constructional form of this further development of the invention is distinguished by the fact that the wall is formed by a cylindrical or flat slide valve, which is connected with a rod system as a means of adjustment. Another design provides for making the recesses changeable both as to their size and/or their position.

In those cases in which the wall extends across a complete inside diameter of the pipe, the recesses may be cuniform, whereby the apex of the wedge will point toward the bottom of the wall and the recesses may also have a semicircular shape.

As a rule, the wall will start out from the bottom of the pipe, then care will be taken by a suitable arrangement of the recesses that all feed lines of the mixture will be supplied with fuel as much as possible to the same extent.

Further objects of the invention will be apparent from the following description when considered in connection with the accompanying drawings in which.

Figure 5:
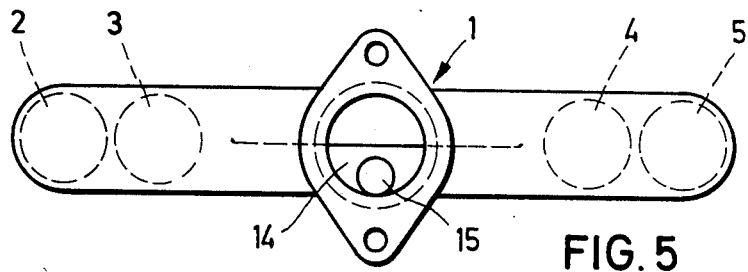
FIG. 5 is a side view of a further modified induction pipe.

In the drawings, FIGS. 1 and 2, 3 and 4 as well as 9 and 10 each represent two views of different designs given by way of example, displaced by 90°, while the FIGS. 5 to 8 illustrate four other designs by way of example each time in the same view.

Each embodiment is based on an induction or suction pipe for the mixture for internal combustion engines with four cylinders, generally designated by 1, so that consequently there will be four feed lines 2 to 5 for the feed mixture. At the same time the feed lines 3 and 4 for the mixture assigned to the middle cylinders are the rear lines in the direction of the intake 6 of the mixture, while the lines 2 and 5 assigned to the outside cylinders are provided in front in the direction of the intake 6. As can be seen from the drawings, all feed pipes for the mixture are provided at least approximately at the same height and consequently their branching off places from the distributor section all lie at the same height. All pipes 2 to 5 in this embodiment have been disposed horizontally.

In order that all supply lines of the mixture for the various cylinders will obtain a mixture which is as much as possible of the same composition, a wall has been disposed, according to the invention, in the path of the inflowing mixture (arrow 6 in FIG. 2), which wall therefore represents a breaker plate for the stream of the mixture. The embodiments according to the figures differ essentially in regard to the development of this wall one from the other. If one at first observes the embodiment according to FIGS. 1 and 2, there the wall 8, starting from the lower bottom of the induction pipe 1 for the mixture, extends about to the level of the central line of the arrangement. If the wall were not subdivided by the recess 9, which is cuniform in this embodiment, the wall 8 in the case of a cold start would direct the lower half of the cross section of the mixture into the two front feed pipes 2 and 5 of the mixture, while for the supply of the rear lines 3 and 4 the upper part of the square section would be left over. The consequence of this would be that the outside supply lines 2 and 5 for the mixture would be fed with cold start mixtures, while the two inner lines 3 and 4 would obtain a mixture of insufficient ignitability, that is too lean. In order to avoid this disadvantage, the recess 9, which in the case of the embodiment of FIGS. 1 and 2 is cuniform, is contained in the wall 8, which recess assures that the two rear and the two front feed lines for the mixture will be fed in the same manner by the mixture flowing in, according to arrow 6.

Figure 2:
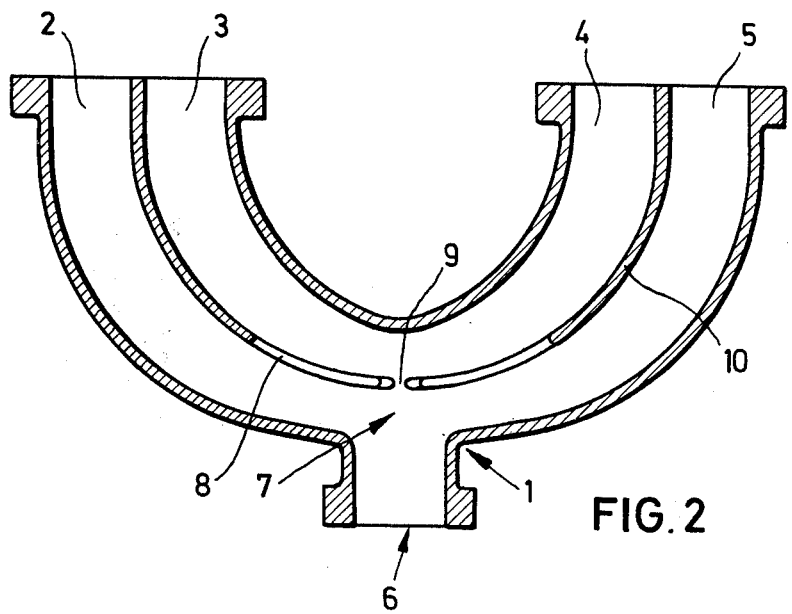
FIG. 2 is a cross-section of the induction pipe of FIG. 1.

As clearly shown in FIG. 2, the wall 8 extends, by the intermediate wall 10 aligned with it, between the pairs of feed pipes for the mixture lying one behind the other.

Figure 1:
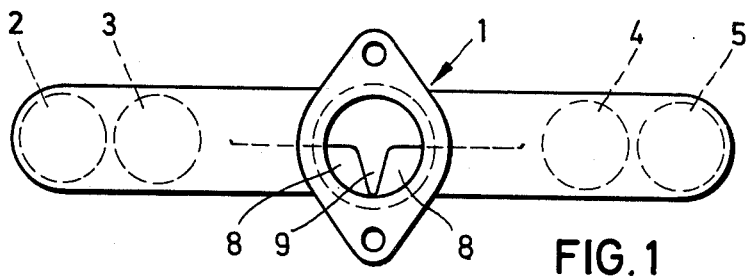
FIG. 1 is a side view of the induction pipe.
Figure 3:
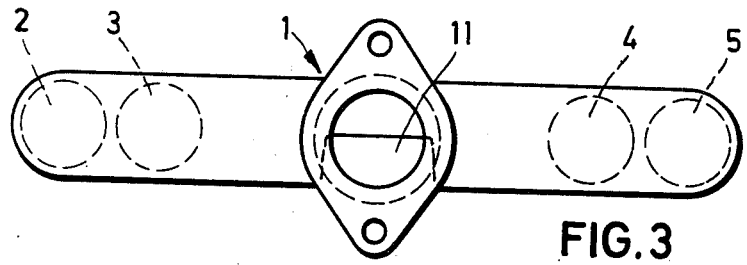
FIG. 3 is a side view of a modified induction pipe.
Figure 4:
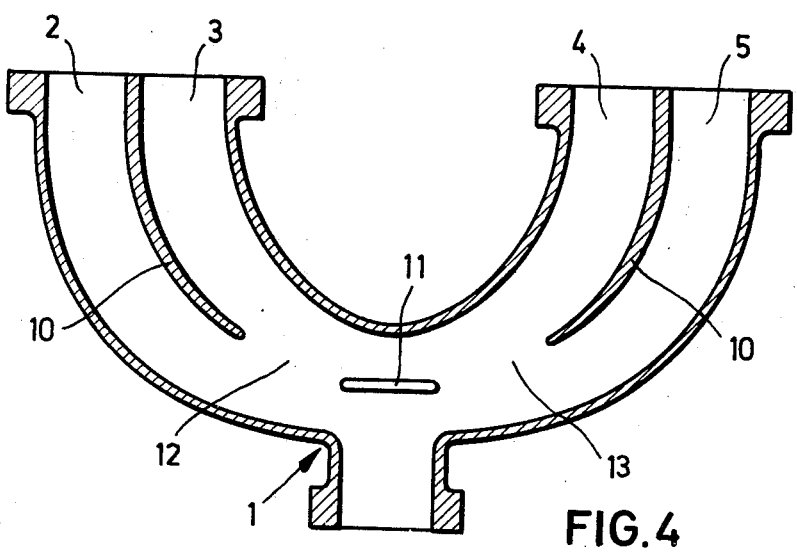
FIG. 4 is a cross section of the induction pipe of FIG. 3.

In this respect, the embodiment of the invention shown in FIGS. 3 and 4 differs from that according to FIGS. 1 and 2, but in this case, to be sure, there is likewise a wall 11 extending to half the height. However, this wall 11 is so narrow that it extends only across the strking area of the mixture and it does not pass over into the intermediate wall designated by 10. Between the wall 11 and the side wall 10 therefore, some open distances or spaces 12 and 13 will remain which constitute, just as recess 9 in FIGS. 1 and 2 paths of flow over a definite cross section for inflowing mixture leading to the rear feed lines of the mixture. Probably the effect of this arrangement, shown in FIGS. 3 and 4, can be explained by the fact that within the area of the open distances 12 and 13, there occurs a suction effect of the mixture to the rear lines.

The variation of the invention shown in FIG. 5 resembles the embodiment according to FIG. 1, insofar as again an intermediate wall 14 extending to about half the height is provided which, similarly as shown in FIG. 2, passes over into the intermediate wall aligned therewith. However, while in FIG. 1 a wall with a cuniform recess has been reproduced, wall 14 in FIG. 5 uses a hole 15 as a recess. Just as in the case of the dimensioning of the uniform recess 9, the load and r.p.m. ratios should be taken particularly into consideration, in the case of the dimensioning of the hole 15, as to the drive of the engine.

Figure 6:
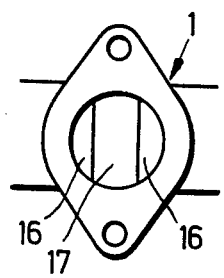
FIGS. 6, 7 and 8 are partial end views of modified inlet portions of the induction pipe.

In the embodiment according to FIG. 6, the wall, which there has been designated by 16, similarly as in the case of the wall 8 in the embodiment according to FIGS. 1 and 2, has been practically subdivided into two partial walls by.means of a recess 17. In this case wall 16, however, extends perpendicularly to the inflow direction across the entire diameter of the induction pipe 1 for the mixture.

Figure 7:
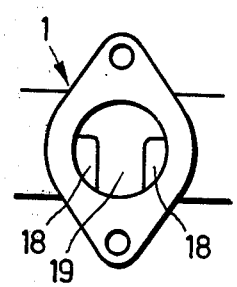
Figure 8:
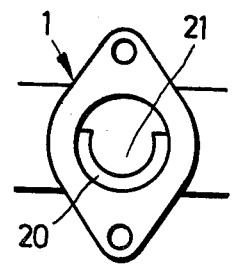

On the other hand, the embodiments according to FIGS. 7 and 8 have walls which likewise merely extend across a part of the inside diameter. The wall 18 in the arrangement according to FIG. 7 has been subdivided into two partial walls by the recess 19 extending to the bottom of the induction pipe 1 of the mixture. The wall 20 in the embodiment according to FIG. 8, in consequence of the approximately semicircular recess 21 and viewed at the upper edge of the wall 20 from the inflow side, has the appearance of a crescent.

Figure 9:
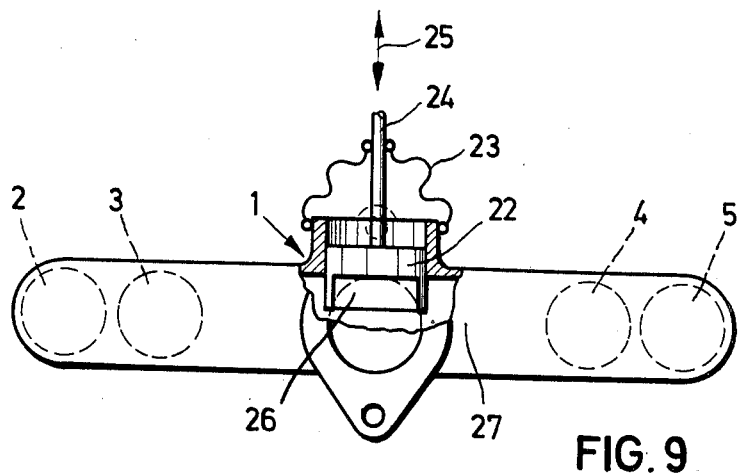
FIG. 9 is a side view partly in section of a further modified induction pipe.
Figure 10:
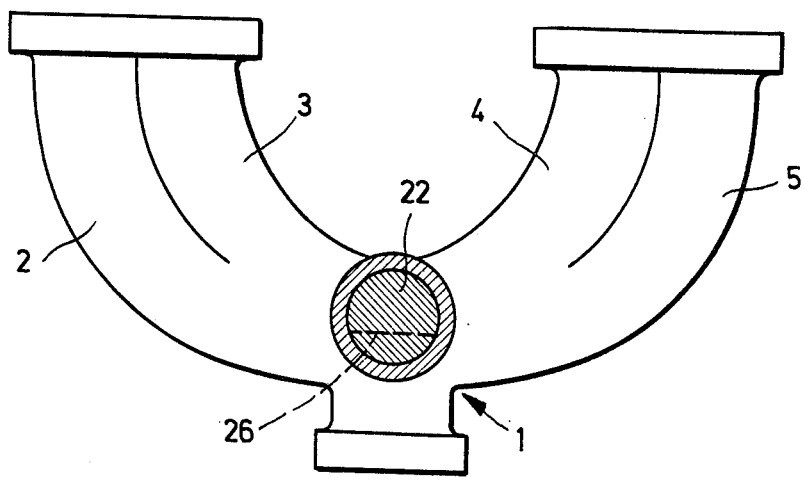
FIG. 10 is top view of another modified induction pipe.

In order to better take into account the dependence of the most favorable shaping of the wall on the pertinent conditions of load and r.p.m., which indeed change considerably during operation of the engine, an arrangement is shown in FIGS. 9 and 10 which will permit during operation an adaptation or adjustment of the influence of the distribution of the mixture to the various cylinders achieved by insertion of the wall in correspondence with the conditions which are most favorable for the pertinent operating state. For this purpose the wall has been provided in the form of a piston 22, which has been sealed by means of the gasket 23 in the area of its end projecting from the induction pipe of the mixture and has been connected with the adjusting lever 24 which brings about an adjustment of the piston 22 in height in the direction of the double arrow 25. The actual deflector 26 has been obtained, for example, by milling away from the piston 22, and the lowest possible position of the piston 22 has been indicated by the line 27. Vice versa, the piston may be pulled out practically completely from the area of the inside width of the induction pipe 1 for the mixture.

The wall may also be developed in some other way, for example in the manner of a sieve, in order to achieve the effect according to the invention.

I claim:

1. Induction pipe for the mixtures for internal combustion engines with at least three cylinders, comprising a distributor section, an inlet defining a horizontally extending path for the mixture flowing into the distributor section, at least one first supply line for the mixture horizontally branching off from the distributor section and leading to at least one first cylinder, at least one second supply line for the mixture horizontally branching off from the distributor section between the inlet and the first supply line at the same height as the first supply line and leading to at least one second cylinder, and a deflector, which runs between the first and second supply lines and transversely to the path of the mixture flowing into the distributor section, for evening the richness of fuel in portions of the mixture flowing into each of the first and second supply lines, the deflector being formed by a wall so narrow that between its side edges on the one hand and intermediate walls lying in alignment therewith and disposed between the first and second supply lines for the mixture on the other hand, there will remain a free distance space.

2. Induction pipe according to claim 1 in which the wall extends perpendicular to the inflow direction over an entire inside diameter of the pipe.

3. Induction pipe according to claim 1, in which the wall, starting out from an inside wall of the induction pipe, extends over one-fourth to one-half the inside diameter of the induction pipe and perpendicular to the inflow direction.

4. Induction pipe for the mixtures for internal combustion engines with at least three cylinders, comprising a distributor section, an inlet defining a horizontally extending path for the mixture flowing into the distributor section, at least one first supply line for the mixture horizontally branching off from the distributor section and leading to at least one first cylinder, at least one second supply line for the mixture horizontally branching off from the distributor section between the inlet and the first supply line at the same height as the first supply line and leading to at least one second cylinder, and a deflector which runs between the first and second supply lines and transversely to the path of the mixture flowing into the distributor section, for evening the richness of fuel in portions of the mixture flowing into each of the first and second supply lines, the deflector being formed by a wall so narrow that between its side edges on the one hand and intermediate walls lying in alignment therewith and disposed between the first and second supply lines for the mixture on the other hand, there will remain a free distance space, said induction pipe further comprising adjusting means for the wall by means of which the wall can be moved more or less into the path of the inflowing mixture.

5. Induction pipe for the mixtures for internal combustion engines with at least three cylinders, comprising a distributor section, an inlet defining a horizontally extending path for the mixture flowing into the distributor section, at least one first supply line for the mixture horizontally branching off from the distributor section and leading to at least one first cylinder, at least one second supply line for the mixture horizontally branching off from the distributor section between the inlet and the first supply line at the same height as the first supply line and leading to at least one second cylinder, and a deflector which runs between the first and second supply lines and transversely to the path of the mixture flowing into the distributor section, for evening the richness of fuel in portions of the mixture flowing into each of the first and second supply lines, the deflector being formed by a wall so narrow that between its side edges on the one hand and intermediate walls lying in alignment therewith and disposed between the first and second supply lines for the mixture on the other hand, there will remain a free distance space, said induction pipe further comprising adjusting means for the wall by means of which the wall can be moved more or less into the path of the inflowing mixture, the wall being formed by a slide valve which is connected with a rod system.

6. Induction pipe according to claim 4, in which the adjusting means are operated in dependence on the r.p.m. and the load.

7. Induction pipe according to claim 5, in which the slide valve is cylindrical.

8. Induction pipe according to claim 4, in which the adjusting means are operated in dependence on the r.p.m.

9. Induction pipe according to claim 4, in which the adjusting means are operated in dependence on the load.

* * * * *